(12) United States Patent
Speck et al.

(10) Patent No.: US 11,051,519 B2
(45) Date of Patent: Jul. 6, 2021

(54) ENDLESS CONVEYOR BELT FOR A CONVEYOR BAKING OVEN AND BELT LINK FOR SAID ENDLESS CONVEYOR BELT

(71) Applicant: Werner & Pfleiderer Industrielle Backtechnik GmbH, Tamm (DE)

(72) Inventors: Ulrich Speck, Ludwigsburg (DE); Josef Tschida, Freiberg (DE)

(73) Assignee: Werner & Pfleiderer Industrielle Backtechnik GmbH, Tamm (DE)

( * ) Notice: Subject to any disclaimer, the term of this patent is extended or adjusted under 35 U.S.C. 154(b) by 100 days.

(21) Appl. No.: 16/432,121

(22) Filed: Jun. 5, 2019

(65) Prior Publication Data
US 2019/0373900 A1    Dec. 12, 2019

(30) Foreign Application Priority Data
Jun. 6, 2018    (DE) .................... 10 2018 208 960.4

(51) Int. Cl.
*B65G 17/06*    (2006.01)
*F27B 9/24*    (2006.01)
(Continued)

(52) U.S. Cl.
CPC .................. *A21B 1/48* (2013.01); *A21B 1/26* (2013.01); *A21B 3/04* (2013.01); *A23L 3/185* (2013.01); *A23L 5/17* (2016.08)

(58) Field of Classification Search
CPC ........ B65G 15/30; B65G 17/36; B65G 17/46; B65G 17/12; B65G 23/14; B65G 15/42; B65G 23/02; B65G 67/08; B65G 17/064; A21B 1/48; A21B 1/24; B65B 35/14; B65B 35/24; A22C 11/008; F27B 9/24; F27B 9/00; F28F 9/0243; F28F 9/002; F28F 9/0224; F28F 9/0246
See application file for complete search history.

(56) References Cited

U.S. PATENT DOCUMENTS 2,149,537 A * 3/1939 Morton .................... A21B 5/02
99/443 R
3,478,705 A * 11/1969 Lanham, Jr. .......... A21C 13/02
99/353
(Continued)

FOREIGN PATENT DOCUMENTS

DE    2403488 A1    8/1974
DE    69112035       1/1996
(Continued)

Primary Examiner — Gregory A Wilson
(74) Attorney, Agent, or Firm — Smartpat PLC

(57) ABSTRACT

An endless conveyor belt for a conveyor baking oven has a conveyor run with a plurality of belt links configured in one piece, the belt links extending transversely to a conveying direction and being mounted between lateral guides. Seen in projection in a plane perpendicular to a conveying plane, each of the belt links has gas passage openings. These gas passage openings have a total opening surface area, which amounts to at least 30% of a total surface area of the projection of the belt link. The result is an endless conveyor belt, which allows a baking space of a conveyor baking oven equipped with an endless conveyor belt of this type to be heated more efficiently and flexibly.

5 Claims, 9 Drawing Sheets

(51) Int. Cl.
      *A21B 1/48*       (2006.01)
      *A23L 5/10*       (2016.01)
      *A21B 1/26*       (2006.01)
      *A21B 3/04*       (2006.01)
      *A23L 3/18*       (2006.01)

(56) References Cited

U.S. PATENT DOCUMENTS

| | | |
|---|---|---|
| 4,118,181 A | 10/1978 | Onodera et al. |
| 4,493,308 A * | 1/1985 | Hurley .................. A47J 37/067 |
| | | 122/17.2 |
| 5,010,808 A * | 4/1991 | Lanham .................... A21B 1/48 |
| | | 198/778 |
| 5,078,120 A | 1/1992 | Hwang et al. |
| 5,906,485 A * | 5/1999 | Groff ........................ A21B 1/48 |
| | | 432/121 |
| 7,325,486 B1 | 2/2008 | Nordby et al. |
| 10,605,330 B2 * | 3/2020 | Dalgaard-Nielsen ..... F16G 1/28 |
| 2008/0164006 A1 * | 7/2008 | Karamanos ........... F28F 9/0246 |
| | | 165/67 |
| 2010/0112169 A1 | 5/2010 | Gunawardena et al. |
| 2015/0047952 A1 | 2/2015 | Talsma et al. |
| 2019/0113103 A1 * | 4/2019 | Shaw ...................... F16G 3/003 |
| 2019/1643212 | 12/2019 | Speck |
| 2020/0277141 A1 * | 9/2020 | Ga Ner ................ B65G 47/763 |

FOREIGN PATENT DOCUMENTS

| | | | |
|---|---|---|---|
| DE | 201810208960 | 12/2019 | |
| EP | 1621484 A1 * | 2/2006 | ........... B65G 17/068 |
| GB | 1439971 A | 6/1976 | |
| WO | 2013142136 A1 | 9/2013 | |

\* cited by examiner

ENDLESS CONVEYOR BELT FOR A CONVEYOR BAKING OVEN AND BELT LINK FOR SAID ENDLESS CONVEYOR BELT

CROSS-REFERENCES TO RELATED APPLICATIONS

This application claims the priority of German Patent Application. Serial No. DE 10 2018 208 960.4, filed Jun. 6, 2018, pursuant to 35 U.S.C. 119 (a)-(d), the content of which is incorporated herein by reference in its entirety as if fully set forth herein.

TECHNICAL FIELD

The invention relates to an endless conveyor belt for a conveyor baking oven. The invention further relates to a belt link for an endless conveyor belt of this type, to a baking oven module with an endless conveyor belt of this type, and to a baking oven with an endless conveyor belt of this type.

BACKGROUND

An endless conveyor belt for a conveyor baking oven is generally known. There the belt links are provided as tubes running transversely to the conveying direction, with a wire mesh being welded thereupon to carry bakery products or bakery product carriers. DE 691 12 035 T2 describes an oven assembly for large-scale cooking where food is transported continuously through a cooking chamber along a spiral, vertically ascending path. Similar oven assemblies are shown in U.S. Pat. No. 4,118,181 A and in US 2010/0 112 169 A1. U.S. PAt. No. 7,325,486 B1 discloses an apparatus for food preparation. DE-OS 2 403 488 discloses a process and a continuous oven for the treatment of foodstuffs. WO 2013/142 136 A1 describes a spiral conveyor. US Pat. No. 5,906,485 A discloses a tunnel belt oven that uses radiant heat and convection heat to prepare food. EP 1 621 484 A1 discloses a modular grid structure that can be interconnected as a cladding element, encasing rods of a conveyor belt.

SUMMARY

It is an object of the present invention to refine an endless conveyor belt of the type named at the outset in such a way that a baking space of a conveyor baking oven equipped with an endless conveyor belt of this type can be heated more efficiently and flexibly.

This object is achieved by an endless conveyor belt for a conveyor baking oven, having a conveyor run with a plurality of belt links configured in one piece, the belt links extending transversely to a conveying direction and being mounted between lateral guides, wherein each of the belt links, seen in projection in a direction perpendicular to a conveying plane, has gas passage openings with a total opening surface area, which amounts to at least 30% of a total surface area of the projection of the belt link.

The inventors found that a size of a total opening surface area of gas passage openings in the belt links, seen in a projection perpendicular to a conveying plane, helps to enhance the efficiency of a baking space heating in such a way that a flow resistance for a fluid, for example air, which passes through the baking space after passing through the conveyor run of the endless conveyor belt, is reduced. In relation to the total projection surface area of the belt link on the conveying plane, the total opening surface area of the gas passage openings when seen in the same projection direction may be greater than 30%, may be greater than 40%, may be greater than 50% and may even be greater. A belt path of the endless conveyor belt can be such that a conveyor run passing through a baking space of the conveyor baking oven runs along a straight line in one plane. The one-piece configuration of the belt links increases the stability of the endless conveyor belt. An unwanted displacement between support members and frame members, which may occur in multi-part configurations of prior-art belt links, is avoided. The one-piece belt links may form self-supporting cross-members of the conveyor belt.

Link planes in which respective gas passage openings are formed, the link planes being spaced from each other in a direction perpendicular to the conveying plane, increase a stability of the respective belt link.

Longitudinal extensions of the gas passage openings of one of the link planes along the belt link extension and/or transverse to the belt link extension ensure a defined stability of the belt link in relation to load forces occurring in particular directions. The longitudinally extending through-openings allow the belt link to be reinforced in a longitudinal direction. Correspondingly, the transversely extending through-openings allow the belt link to be reinforced in a transverse direction.

A self-supporting design of the belt links between suspension mounting plates by which they are mounted to the lateral guides, prevents undesirable wear as an undesirable contact between the belt links and a non-moving base plate of the baking oven can be avoided.

The advantages of the disclosed belt link, of a baking oven module with an endless conveyor belt and with a baking space through which a conveyor run of the conveyor belt runs and of a baking oven with an endless conveyor belt and with a baking space through which a conveyor run of the conveyor belt runs, correspond to those that have already been explained above with reference to the endless conveyor belt. The baking oven can be a conveyor baking oven, in particular a tunnel oven. The baking oven can be made up of a plurality of baking oven modules, which may in particular have the same design.

An exemplary embodiment of the invention will hereinafter be explained in more detail by means of the drawing.

DETAILED DESCRIPTION

Figure 1:
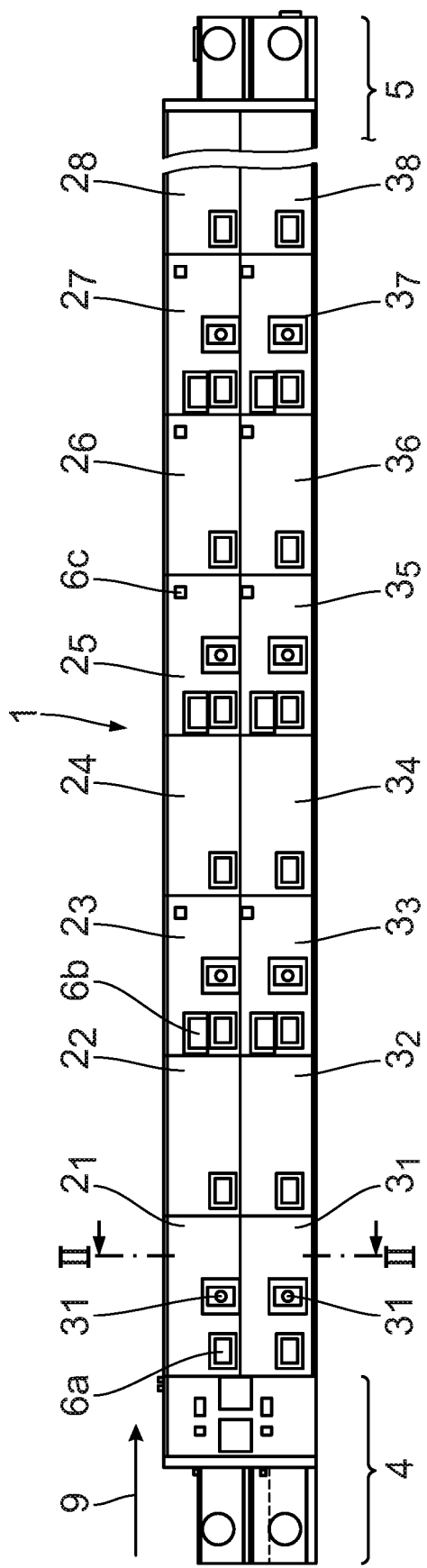
FIG. 1 shows a side view of a modular baking oven.

FIG. 1 shows a total side view of a conveyor baking oven 1 configured as a tunnel oven, which allows long-life bakery products such as soft biscuits, crispy biscuits or lye pastries to be produced. Other bakery products such as toast can also be processed in the baking oven. The baking oven 1 also allows roasting and special applications such as drying or sterilizing. In the embodiment shown, the baking oven 1 is shown in an interrupted view and has a plurality of oven modules $2_i$, $3_i$ with baking spaces, which combine to form two conveyor baking spaces arranged on top of one another between a respective initial oven module $2_1$, $3_1$ arranged in a leading manner in a bakery product conveying direction and a respective final oven module $2_N$, $3_N$, which forms the last oven module in the bakery product conveying direction (i=1, . . . , N, N: number of oven modules). FIG. 1 shows a total of eight oven modules $2_1$ to $2_8$, which belong to an upper conveyor baking space, and eight oven modules $3_1$ to $3_8$ arranged therebelow, which belong to a lower conveyor baking space of the conveyor baking oven 1. In other words, the oven modules of the conveyor baking oven 1 are arranged on two levels.

The oven modules $2_1$ to $2_8$ and $3_1$ to $3_8$ each have the same basic design, in particular in terms of a support frame design and receptacles for attached and mounted parts. The oven modules $2_1$ to $2_8$ and $3_1$ to $3_8$ therefore have the same dimensions, in other words they generally have the same spatial requirements in terms of height, width and depth.

The oven modules $2_1$ to $2_8$ and $3_1$ to $3_8$ are provided as separate modules first, which are connected to each other when the baking oven 1 is being assembled. In each of the baking oven modules $2_1$ to $2_8$ and $3_1$ to $3_8$, heated circulating air is guided in circulation by heat exchangers, which will be described below. The upper oven modules $2_1$ to $2_8$ are carried by the lower oven modules $3_1$ to $3_8$. The lower oven modules $3_1$ to $3_8$ are carried by a machine base.

In front of an initial baking oven module $2_1$ and $3_1$ each arranged in a leading manner in the bakery product conveying direction, a loading module 4 for the bakery products is arranged, which also has a two-level design and communicates with the two conveyor baking spaces. Behind a final oven module $2_i$ and $3_i$, which is the last one when seen in the bakery product conveying direction, a discharge module 5 of the conveyor baking oven 1 is arranged to receive and discharge the bakery product from the conveyor baking spaces after baking, the discharge module 5 having a two-level design as well and communicating with the two conveyor baking spaces. The loading module 4 on the one hand and the discharge module 5 on the other close the circulating air cycle at the beginning and at the end of the conveyor baking spaces.

Between the oven modules $2_8$, $3_8$ and the discharge module 5, the conveyor baking oven 1 is shown in an interrupted view in FIG. 1 to indicate that the number of oven modules $2_i$, $3_i$ may be greater than that shown in FIG. 1. For example, the number N of the oven modules $2_i$, $3_i$ may vary between 5 and 20 in practical application.

Bakery products to be baked enters, via the loading module 4, the respective conveyor baking space 7, 8, in other words the respective initial oven module $2_1$, $3_1$ arranged in a leading manner, passes through the respective conveyor baking space 7, 8 along the bakery product conveying direction 9 and, having passed through the respective final oven modules $2_i$, $3_i$, exits the conveyor baking spaces 7, 8 via the discharge module 5 as a freshly baked product.

In the side view of the conveyor baking oven as shown in FIG. 1, some or all of the oven modules $2_i$, $3_i$ are further provided with in each case one cleaning opening 6a, in each case one inspection opening 6b, and in each case one fume opening 6c. The respective fume opening 6c allows fumes to be introduced into and removed from the respective baking space of the oven module $2_i$, $3_i$.

Figure 2:
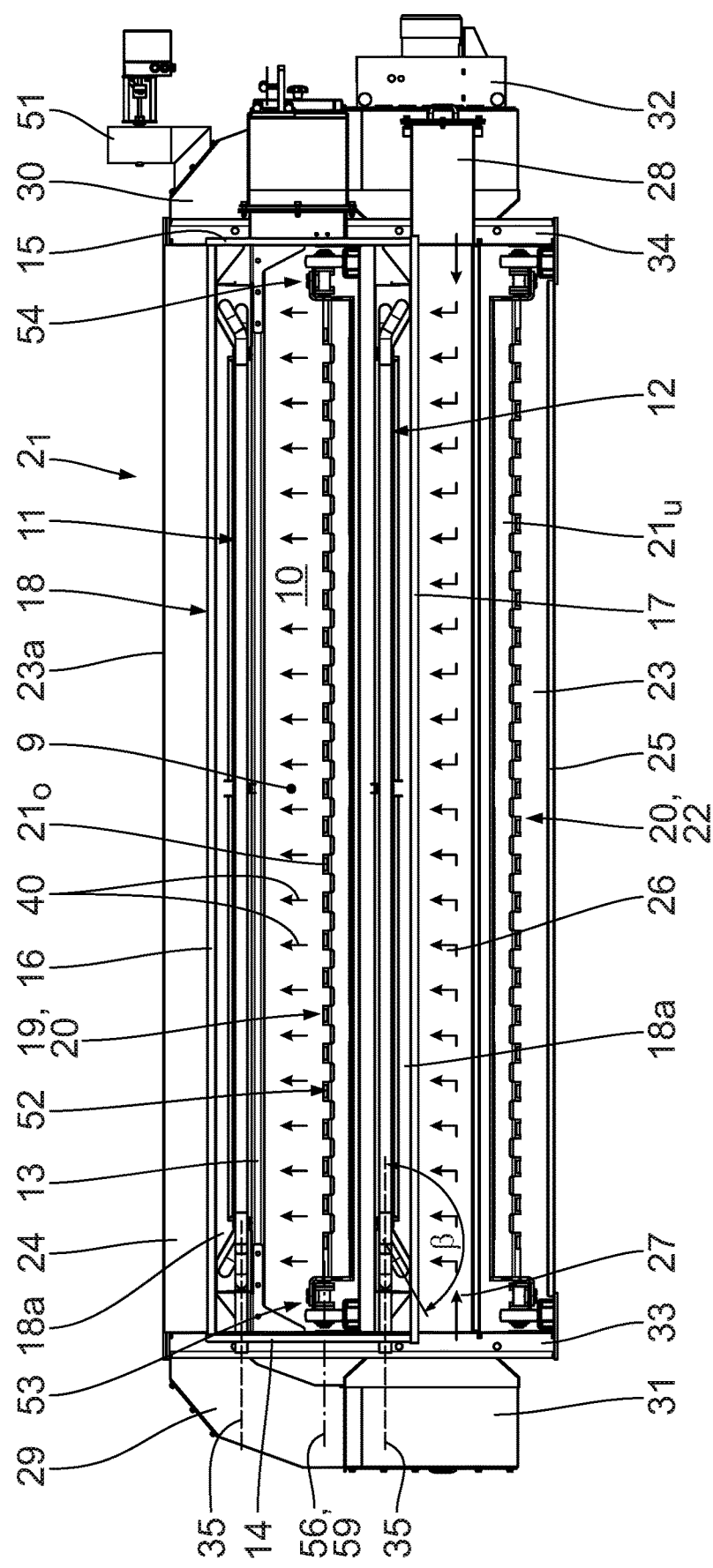
FIG. 2 shows a sectional view along line II-II in FIG. 1.
Figure 3:
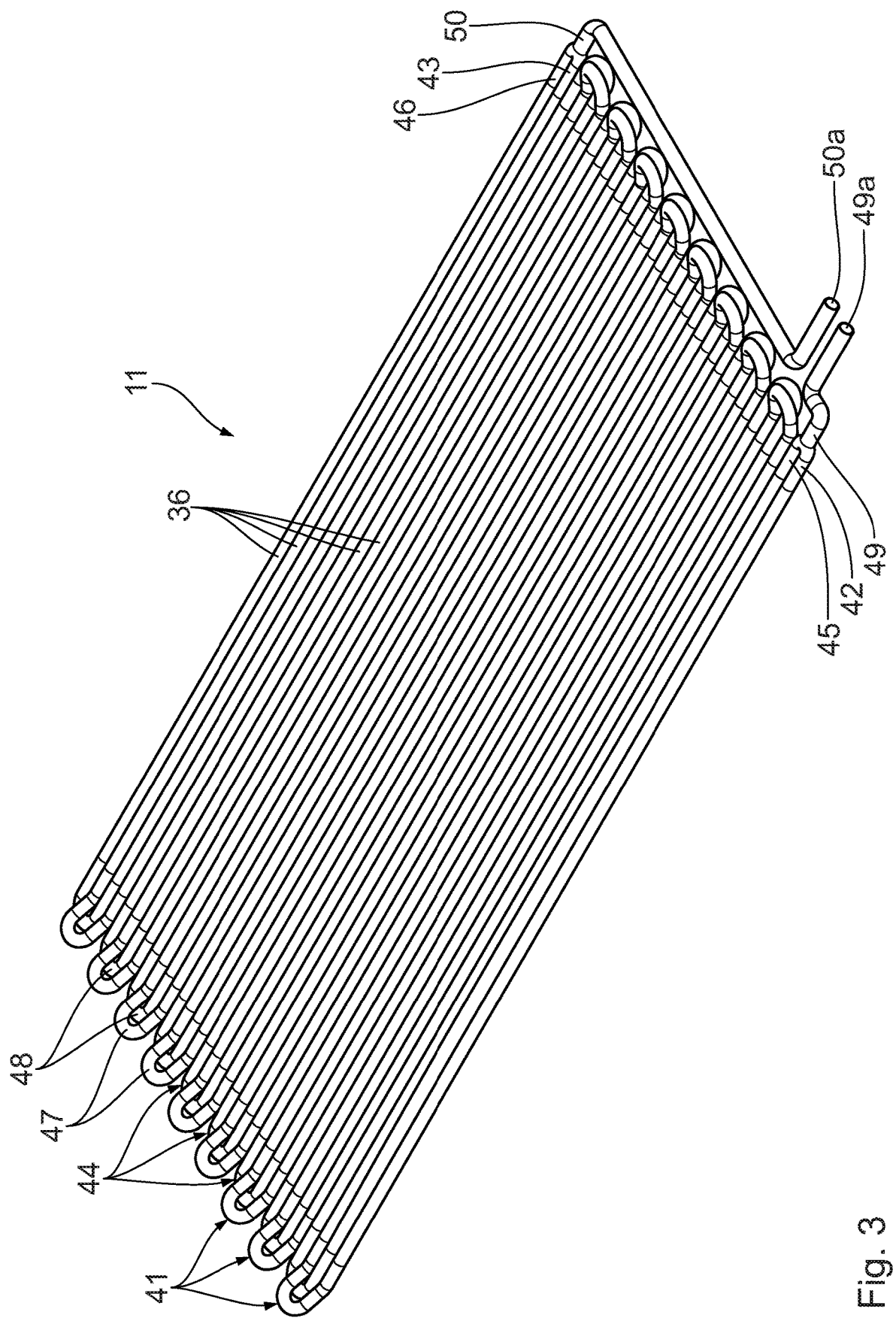
FIG. 3 shows a perspective view of a pipe coil heat exchanger for a baking oven module of the baking oven as shown in FIG. 1.

FIG. 2 shows a sectional view of two baking oven modules $2_i$, $3_i$; arranged on top of one another. The conveying direction 9 is perpendicular to the sectional or drawing plane of FIG. 2. FIG. 3 shows an exemplary and more detailed view of one of the oven modules $2_i$. The oven modules $3_i$ have the same design so it is sufficient to show, in the detailed illustration of FIG. 3, only one of the oven modules $2_i$ to serve as example. Details not shown in FIG. 2 can then be found in FIG. 3.

The baking oven modules $2_i$, $3_i$ each have a baking space 10, which is heated, on the one hand, directly by the circulating air, and, on the other hand, by radiant heat, which is generated by heat exchangers configured as two pipe coil heat exchangers 11, 12. The baking spaces 10 each form part of the two conveyor baking spaces 7, 8 arranged on top of one another, which are formed by the upper oven modules $2_i$ on the one hand and by the lower oven modules $3_i$ on the other. The pipe heat exchanger 11 arranged above the respective baking space 10 generates top heat for the baking space 10. The pipe heat exchanger 12 arranged below the baking space generates bottom heat for the baking space 10.

The heat carrier fluid flowing through the pipe heat exchangers 11, 12 is thermal oil. Together with a thermal oil source not shown, the two heat exchangers 11, 12 form a thermal oil heating device.

The upper pipe heat exchanger 11 is carried by a retaining frame 13 mounted to lateral frame sidewalls 14, 15 of the baking oven module $2_i$, $3_i$. Together with an upper retaining plate 16 and a lower retaining plate 17, the two frame sidewalls 14, 15 form a baking oven module 18, which houses—amongst other things—the two pipe heat exchangers 11, 12 of the baking oven module $2_i$, $3_i$. Between the upper retaining plate 16 and the upper pipe heat exchanger 11, an air baffle 18a is arranged. Said air baffle 18a serves to ensure a uniformity of a circulating airflow in the baking space 10. The air baffle 18a is also capable of absorbing thermal energy from the pipe heat exchanger 11 and of releasing said thermal energy to the circulating air, in other words it may be used as an additional indirect heat exchanger component. A corresponding air baffle 18a is arranged between the lower pipe heat exchanger 12 and the lower retaining plate 17.

An upper conveyor run 19 of an endless conveyor belt 20 runs between the two pipe heat exchangers 11, 12, said upper conveyor run 19 being used to convey the bakery products through the respective conveyor baking space 7, 8 between the loading module 4 and the discharge module 5. In accordance with its two-level design, the conveyor baking oven 1 has two endless conveyor belts 20, namely an upper endless conveyor belt 20 for the baking oven modules $2_i$, and a lower endless conveyor belt 20 configured in the same way for the lower oven modules $3_i$. Therefore, it is sufficient to describe one of these conveyor belts in the following sections.

The conveyor belt 20 has a plurality of belt links 21 of which an upper belt link $21_o$ and a lower belt link $21_u$ are shown in FIG. 2. In its current operating position, the upper belt link $21_o$ is part of the upper conveyor run 19 and is arranged in the baking space 10. The lower belt link $21_u$ is part of a lower belt run 22, which is part of the endless conveyor belt 20 running through a return conveyor belt space 23 in a direction counter to the conveying direction 9 below the baking space 10 and the lower pipe heat exchanger 11.

Between the upper retaining plate 16 of the baking space module 18 and an upper module plate 23a of the baking oven module $2_i$, $3_i$, an upper circulating air duct 24 is arranged. Between the lower retaining plate 17 of the baking space module 18 and a lower module plate 25, a lower circulating air duct 26 is arranged. The two circulating air ducts 24, 26 extend across the entire width of the baking oven module $2_i$, $3_i$.

The two circulating air ducts 24, 26 are in a fluidic connection, via inlet and exhaust air ducts 27, 28, 29, 30, with two axial/radial fans 31, 32. Altogether, they produce a respective circulating air cycle in the respective oven module $2_i$, $3_i$. The baking space 10 of the respective oven module $2_i$, $3_i$ is part of this circulating air cycle. Together with the respective circulating air cycle, the fans 31 and 32, respectively, are components of a circulating air system of the conveyor baking oven 1.

The two fans 31, 32 and the inlet and exhaust air ducts 27 to 30 are mounted to vertically extending lateral frame plates 33, 34 of the baking oven module $2_i$, $3_i$.

Taking the example of the upper pipe coil heat exchanger 11, FIG. 3 shows one of the two pipe heat exchangers used in the baking oven module $2_1$. All pipe heat exchangers 11, 12 of the baking oven modules $2_i$, $3_i$ of the baking oven 1 have the same design so it is sufficient to describe, in the following sections, this upper pipe heat exchanger 11.

The pipe heat exchanger 11 has a plurality of, strictly speaking thirty-six in the exemplary embodiment shown, heat exchanger pipe sections 36 arranged adjacent to each other in an arrangement plane (cf. plane 35 in FIG. 2) to guide a heat carrier fluid. The heat carrier fluid used may in particular be thermal oil.

The adjacent arrangement of the heat exchanger pipe sections 36 in the arrangement plane 35 may be such that in an actual side view as shown in FIG. 2, all heat exchanger pipe sections are entirely flush with each other. Alternatively, longitudinal axes of in particular adjacent pipe sections 36 may have various distances from the arrangement plane 35. However, a bandwidth of the distances of the longitudinal axes of the pipe sections 36 from the arrangement plane 35 is still smaller than a diameter of the individual pipe sections 36, and is in particular smaller than a fraction of this diameter, for example smaller than 80%, smaller than 70%, smaller than 60%, smaller than 50%, smaller than 40%, smaller than 30%, smaller than 20%, and may in particular be smaller than 10% of the diameter of the pipe sections 36. The pipe diameter of the pipe sections 36 may be in the range between 10 mm and 150 mm, and may for example be in the range between 25 mm and 50 mm, for example 35 mm, 38 mm or 40 mm. If the pipe sections 36 are not entirely flush with each other when seen in a side view, for example that of FIG. 2, the longitudinal axes of the pipe sections 36 may in this case have a distance from the arrangement plane, which is in the range between 0 mm and +/−20 mm.

Figure 6:
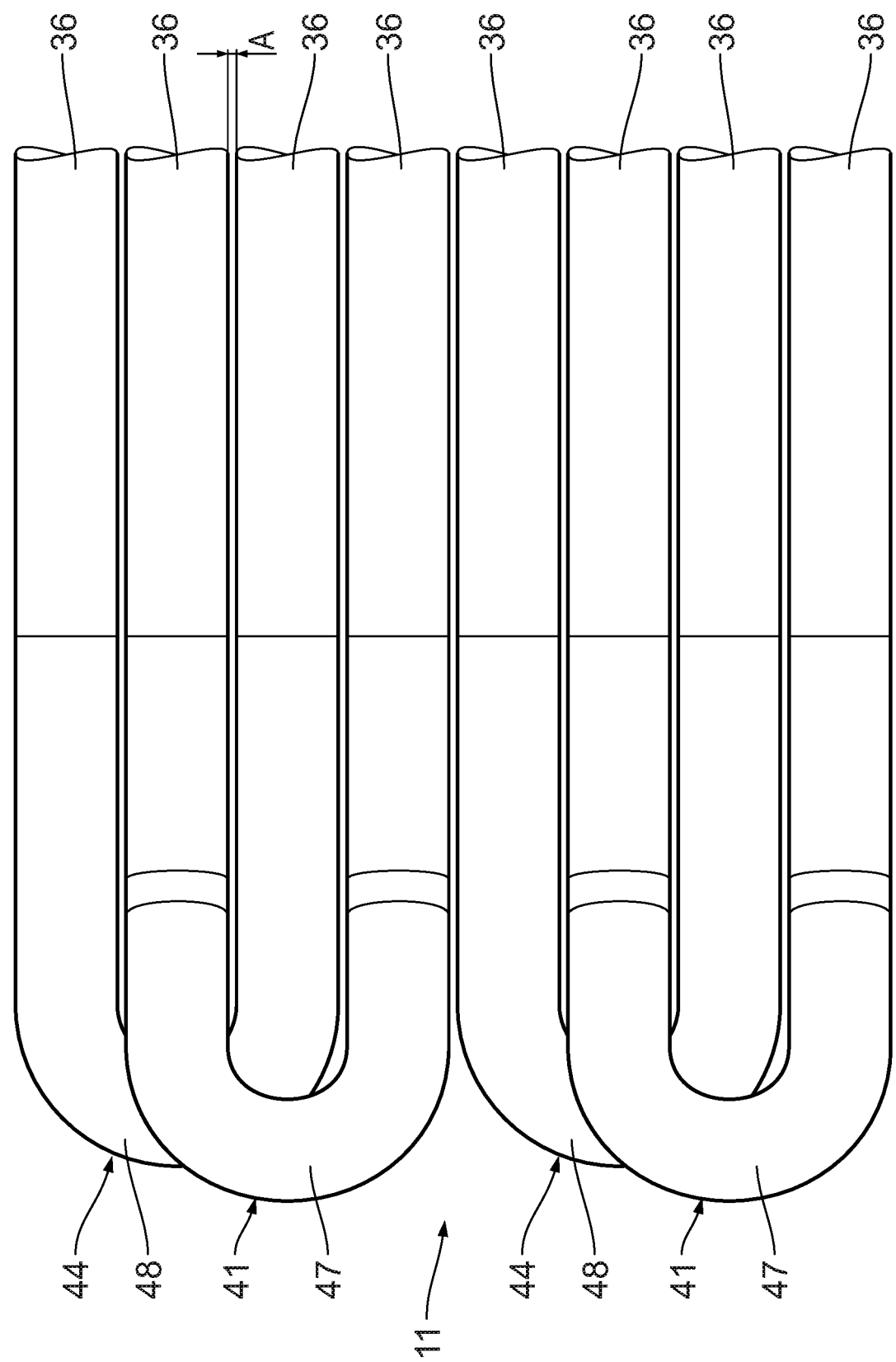
FIG. 6 shows a top view, similar to FIGS. 4 and 5, of a section of a pipe heat exchanger to illustrate a distance between in each case two adjacent pipe sections.

A distance A between two adjacent pipe sections is, on the one hand, smaller than the pipe diameter, and, on the other hand, greater than 1% of the pipe diameter. This distance A is illustrated in FIG. 6, which shows a top view of a section of the pipe heat exchanger 11, for two exemplary adjacent pipe sections 36.

An absolute distance between two adjacent pipe sections 36 may be in the range between 1 mm and 50 mm, in particular in the range between 1 mm and 10 mm, in the range between 1 mm and 5 mm, and may be 2 mm, for example.

This distance between the adjacent pipe sections 36 provides a passage between these pipe sections. A passage of this type runs along a total extension of the pipe sections 36 through the baking space 10 in a direction transverse to the conveying direction 9, and is interrupted—if at all—only by mounting components. Compared to the total extension of the pipe sections 36, these interruptions are very small, usually amounting to less than 5% of the total extension of the pipe sections 36. These passages obtained as a result of the distance between adjacent pipe sections 36 lead to an effective heat transfer from the pipe sections 36 to fluid flowing between two adjacent pipe sections 36.

Figure 7:
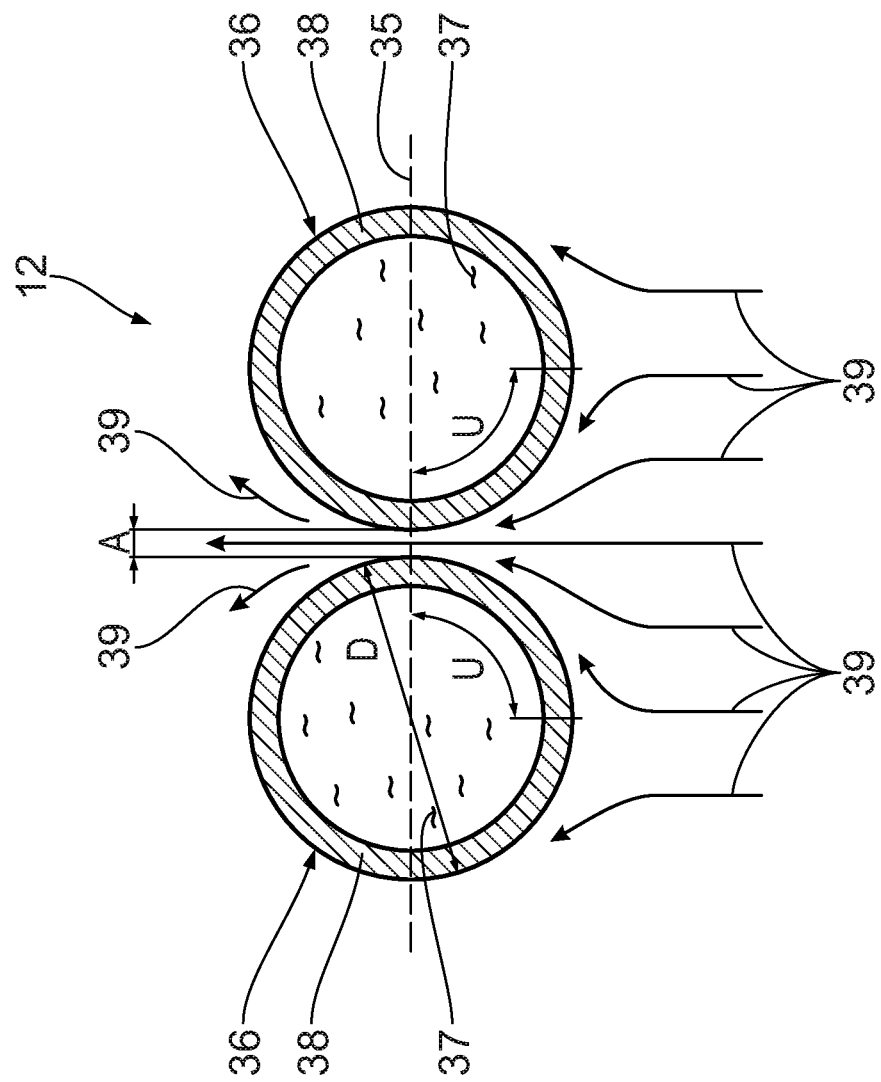
FIG. 7 shows a schematic view of flow relationships generated when a gas exposed to heat emitted by the pipe heat exchanger is flowing through passages between two adjacent pipe sections, shown in cross-section, of the pipe heat exchanger.

Corresponding heat transfer relationships are shown in a greatly schematic view in FIG. 7 for two adjacent pipe sections 36 of the pipe heat exchanger 12. FIG. 7 shows the flow relationships for the lower pipe coil heat exchanger 12. The heat carrier fluid 37 flows through the pipe sections 36. Another heat absorption fluid, which is air 39 in the embodiment described, flows against and around circumferential walls 38 of the pipe sections 36 as shown schematically by some flow arrows. Because of the distance A between the adjacent pipe sections 36, which is in the range between 1% and 100% of the pipe diameter D, the in-flowing air 39 flows between the adjacent pipe sections after contacting circumferential sections U of the circumferential walls 38. Having passed through the narrowest point of the passage between the adjacent pipe sections 36 where the distance A is provided, the flow of air 39 separates from the circumferential wall 37 as it continues to flow, causing the air 39 to flow upwardly in a turbulent manner in such a way that the air that has flown through the observed passage between the adjacent pipe sections mixes effectively with the air 39 that has passed through adjacent passages between the pipe sections 36 shown and adjacent pipe sections on the left- and right-hand sides thereof, which are not shown. Above the arrangement plane 35, in the case of the airflow from bottom to top as shown, a closed and essentially non-interrupted volume airflow is achieved very rapidly towards the baking space 10 arranged at the top, which is represented by flow arrows 40 in FIG. 2. The turbulences ensure that the pipe sections 36 themselves do not serve as baffles for the airflow, thus resulting in a closed air curtain flowing through the baking space 10 above the heat exchanger 12 without gaps.

The pipe heat exchanger 11 is configured as a pipe coil heat exchanger. A first coil line path 41 runs between a first coil line inlet 42 and a first coil line outlet 43. A second coil line path 44 runs between a second coil line inlet 45 and a second coil line outlet 46. The pipe heat exchanger 11 shown in FIG. 3 therefore has precisely two coil line paths 41 and 44. It is generally conceivable to provide a greater number of corresponding coil line paths.

In each case two pipe sections 36 arranged adjacent to each other in the arrangement plane 35 belong to different coil line paths. In the representation as shown in FIG. 3, the pipe section 36 shown at the very bottom left is part of the first coil line path 41. The pipe section 36 arranged directly adjacent thereto in the upper right direction is part of the second coil line path 44. The pipe section in turn arranged adjacent thereto in the upper right direction is then part of the first coil line path 41 again. The other pipe sections 36 arranged adjacent thereto alternatingly belong to the second coil line path 44 and to the first coil line path 41. The pipe section 36 shown at the very upper right then belongs to the second coil line path 44 and leads into the second coil line outlet 46.

Figure 4:
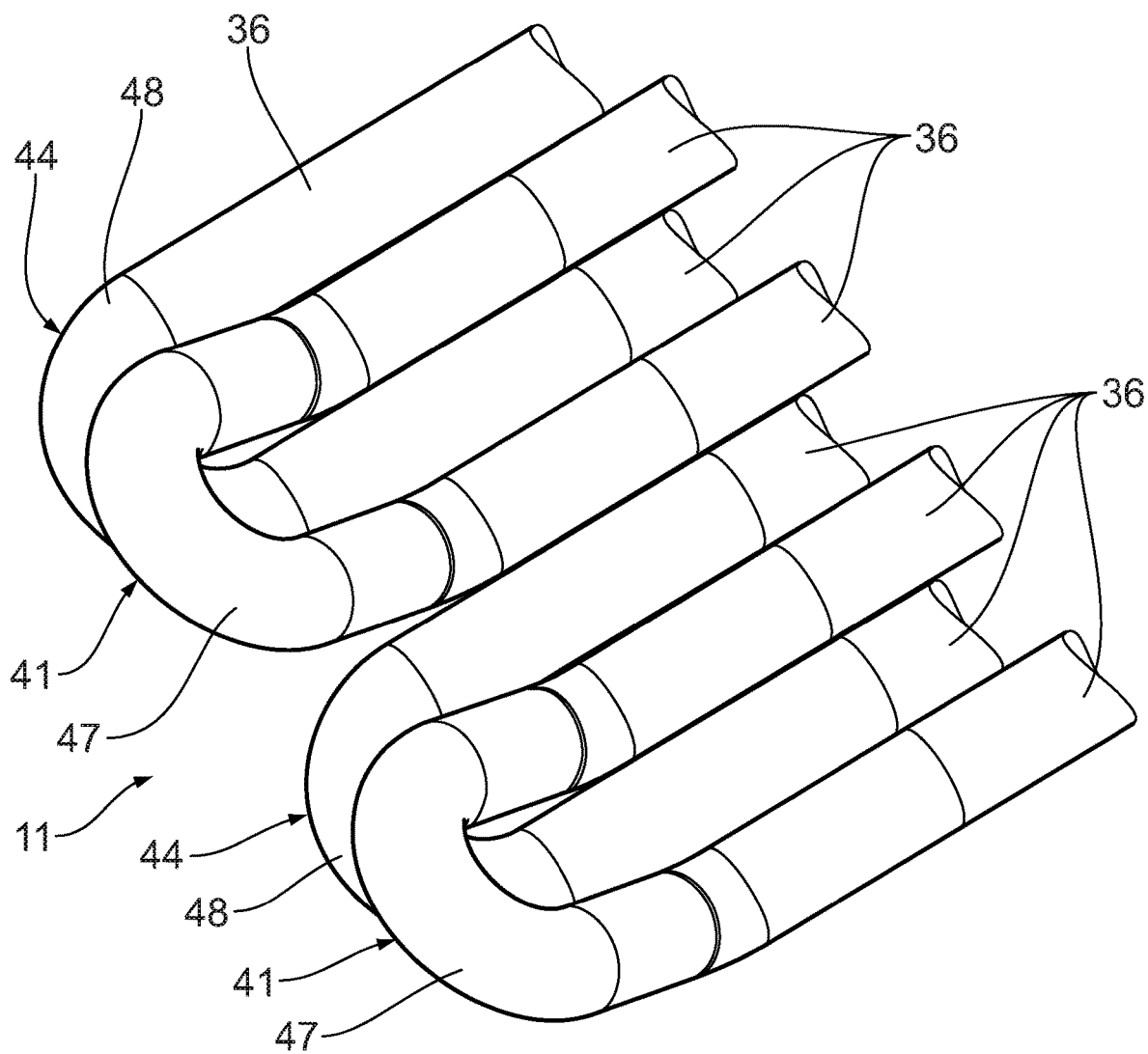
FIG. 4 shows an enlarged sectional view of a perspective view of the pipe heat exchanger as shown in FIG. 3 in the region of 180° deflection sections of two coil line paths.
Figure 5:
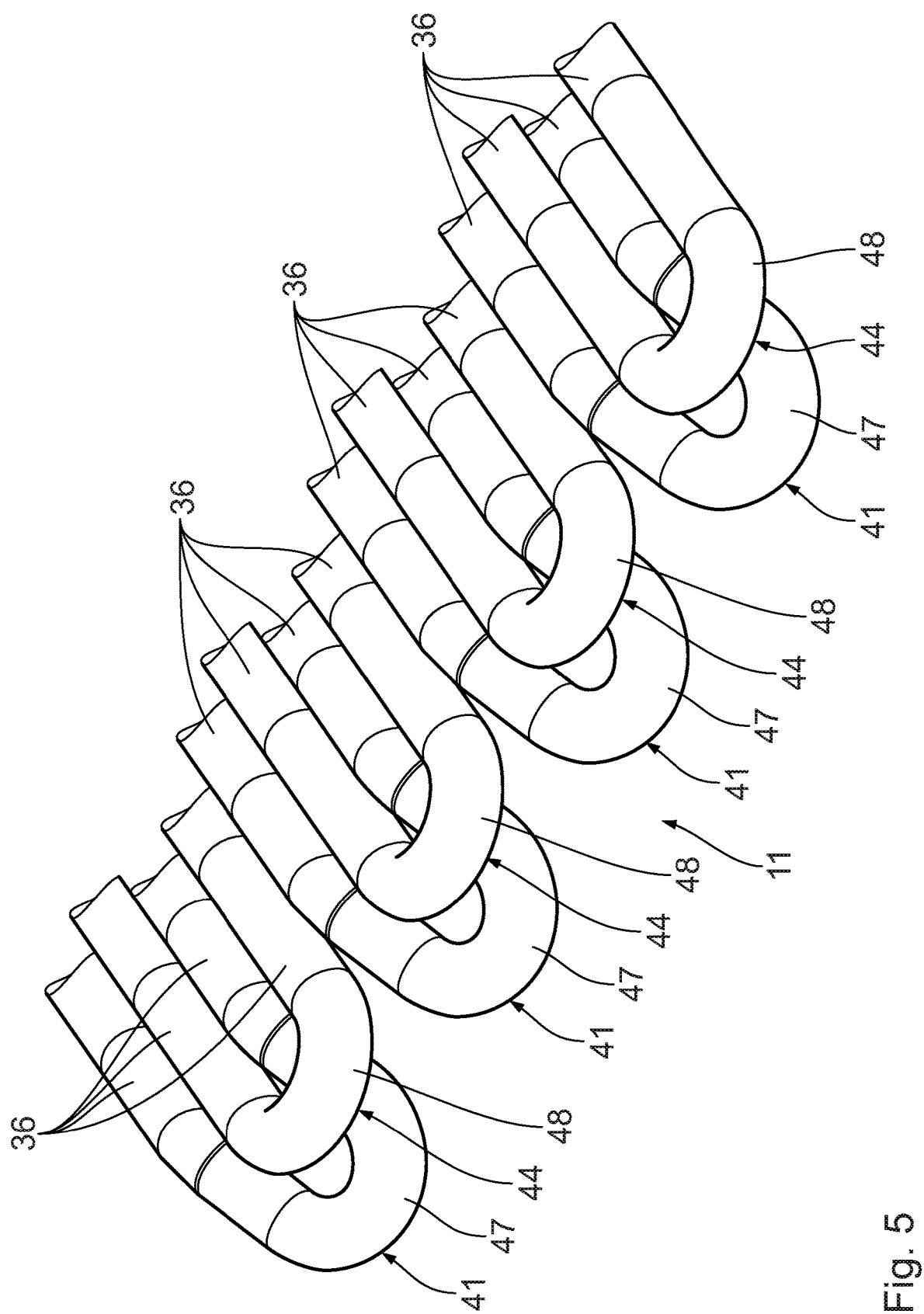
FIG. 5 shows another perspective view, similar to FIG. 4, of the 180° deflection sections, seen approximately from a viewing direction counter to that in FIG. 4.

As the pipe sections 36 are associated to the two coil line paths 41 and 44 in an alternating manner, a minimum bending radius of the pipe sections 36 are made of increases along a respective one of the two coil line paths 41, 44. This increased bending radius is illustrated by the arrangement of 180° deflection sections 47, 48 of the two coil line paths 41, 44, which is shown in particular in FIGS. 4 to 6 each showing enlarged views of the coil line paths 41, 44 of the pipe heat exchanger 11. An inner bending radius of the 180° deflection sections 47, 48 is greater than the pipe radius, in other words it is greater than half of the pipe diameter D. On the other hand, this inner bending radius of the 180° deflection sections 47, 48 is smaller than the pipe diameter D.

By a respective Y-pipe section 49, 50, the two coil line inlets 42, 45 on the one hand and the two coil line outlets 43 and 46 on the other are in a fluidic connection with one another and with a collective inlet 49a on the one hand and a collective outlet 50a on the other.

The two coil line inlets 42, 45 are in a fluidic connection with the collective line inlet 49a by the Y-pipe section 49. The collective line inlet 49a in turn is in a fluidic connection with a heat carrier fluid source not shown in the drawing. The two collective line outlets 43, 46 are in a fluidic connection with the collective line outlet 50a by the additional Y-pipe section 50. The collective line outlet 50a may be in a fluidic connection with the collective line inlet 49a to form a heat carrier fluid cycle. A pump for the heat carrier fluid 37, which is not shown in the drawing either, can be part of this cycle.

The 180° deflection sections 47 for the coil line path 41 are guided out of the arrangement plane 35 between the two pipe sections 36 connected by them in such a way that an obtuse angle is obtained therebetween. A bending angle β between the arrangement plane 35 and an arrangement plane of the 180° deflection sections 47 (cf. FIG. 2 for the pipe heat exchanger 12) is approximately 150° in the embodiment shown. This bending angle can be in the range between 120° and 165°.

Guiding the 180° deflection sections 47 out of the arrangement plane 35 prevents spatial conflicts between the 180° deflection sections 47, 48 of the various coil line paths 41, 44.

A pipe coil heat exchanger configured as the pipe coil heat exchangers 11 and 12 of the baking oven module 6 is produced as follows:

In a first step, a pipe is provided, which has a multiple of the length of one of the pipe sections 36 between the respective deflection sections 47, 48. Then a first coil line path, for example the coil line path 41, is produced by bending the pipe in the region of the deflection sections 47 between the pipe sections 36. Then a second coil line path, in this case the coil line path 44, is produced by bending the pipe of the deflecting sections 48 between the pipe sections 36. As soon as the end of the pipe is reached after these bending steps, another pipe with the same diameter is attached thereto if necessary, in other words it is connected to the pipe that has just been processed, for example it is welded to the front end thereof.

Having produced the two coil line paths 41, 44, the two coil line paths 41, 44 are inserted into one another in the arrangement plane 35. Then the Y-pipe sections 49, 50 can be connected, for example by welding, to the coil line inlets 42, 45 and the coil line outlets 43, 46 to create, if necessary, a fluid passage between the respective Y-pipe section 49, 50 and the respective line inlets 42, 45 on the one hand and outlets 43, 46 on the other.

In a variation of the production method, the 180° deflection sections 47 are bent out of the arrangement plane 35 between the pipe sections 36 of the same coil line path 41 before inserting the two coil line paths 41, 44 into one another. This bending process can take place at the same time when producing this coil line path 41 by using a corresponding, in particular flat, bending tool.

When a baking process is performed using the tunnel conveyor baking oven 1, the bakery product passed through the oven modules 2 to 6 along the conveyor run 19 is heated, on the one hand, by radiant heat emitted by the pipe heat exchangers 11, 12, which are housed in the respective oven modules 2 to 6, and by the circulating air on the other, which flows through the respective baking space 10 of the oven module 2 to 6. The heat contributions "radiant heat" on the one hand and "circulating air heat" (emission of heat to fluid flowing through the baking space) on the other can be predefined by designing the pipe heat exchangers 11, 12 correspondingly, and by the temperature and the flow of the heat carrier fluid 37 passing through the pipe heat exchangers 11, 12, and also by the amount of air flowing through each of the baking spaces 10.

Depending on the design of the oven module 2 to 6, an airflow through the baking space 10 (cf. for example the airflow 40 in FIG. 2) can be directed form bottom to top or, alternatively, from top to bottom.

In the flow example shown in FIG. 2, the left-hand fan 31 in FIG. 2 ensures that the circulating air flows through the inlet air duct 27 and into the lower circulating air duct 26 first. At the same time, the right-hand fan 32 in FIG. 2 ensures that the circulating air flows through the right-hand inlet air duct into the lower circulating air duct 26. The excess pressure, which is then generated in the lower circulating air duct 26, causes the circulating air to flow upwardly from the lower circulating air duct 26 so as to pass through between the adjacent pipe sections 36 of the lower pipe heat exchanger 12 as already described above with reference to FIG. 6. The circulating air then flows through the upper conveyor run 19 of the endless conveyor belt 20 where it flows around the dough pieces conveyed thereon through the baking space 10. The circulating air then flows through the passages between the pipe sections 36 of the upper pipe heat exchanger 11 before flowing into the upper circulating air duct 24 from which the circulating air 31 32 is extracted again by the fans 31, 32 and the outlet air ducts 29, 30 to close the respective circulating air cycle. An excess pressure in the circulating air cycle is able to escape via a flap-controlled exhaust gas pipe 51 (cf. FIG. 2).

Depending on the design of the oven module 2 to 6, the oven module 2 may have fans such as in the embodiment shown in FIG. 2 or, alternatively, only one axial-radial fan, which may then be mounted on one side or on the other side of the oven module. If more than one oven modules arranged one behind the other in the conveying direction 9 are equipped with precisely one fan of this type, the arrangement of this fan may alternate between the two sides of the conveyor baking oven 1, for example, in such a way that the fan in the oven module 3 is arranged on the right-hand side in the manner of the fan 32 while it is arranged on the left-hand side in the following oven module 4 and on the right-hand side again in the following oven module 5, for example. As an alternative or in addition thereto, the flow direction of the circulating air through the baking space 10 may be predefined by correspondingly operating the respective fan 31, 32 from bottom to top or from top to bottom.

It is conceivable to define various temperature zones in the oven modules 2 to 6. This can be done by setting the temperature and/or the flow rate of the thermal oil and/or the amount of circulating air and by setting the flow direction of the circulating air from bottom to top/from top to bottom. This is done using a central control device of the baking oven 1.

Figure 8:
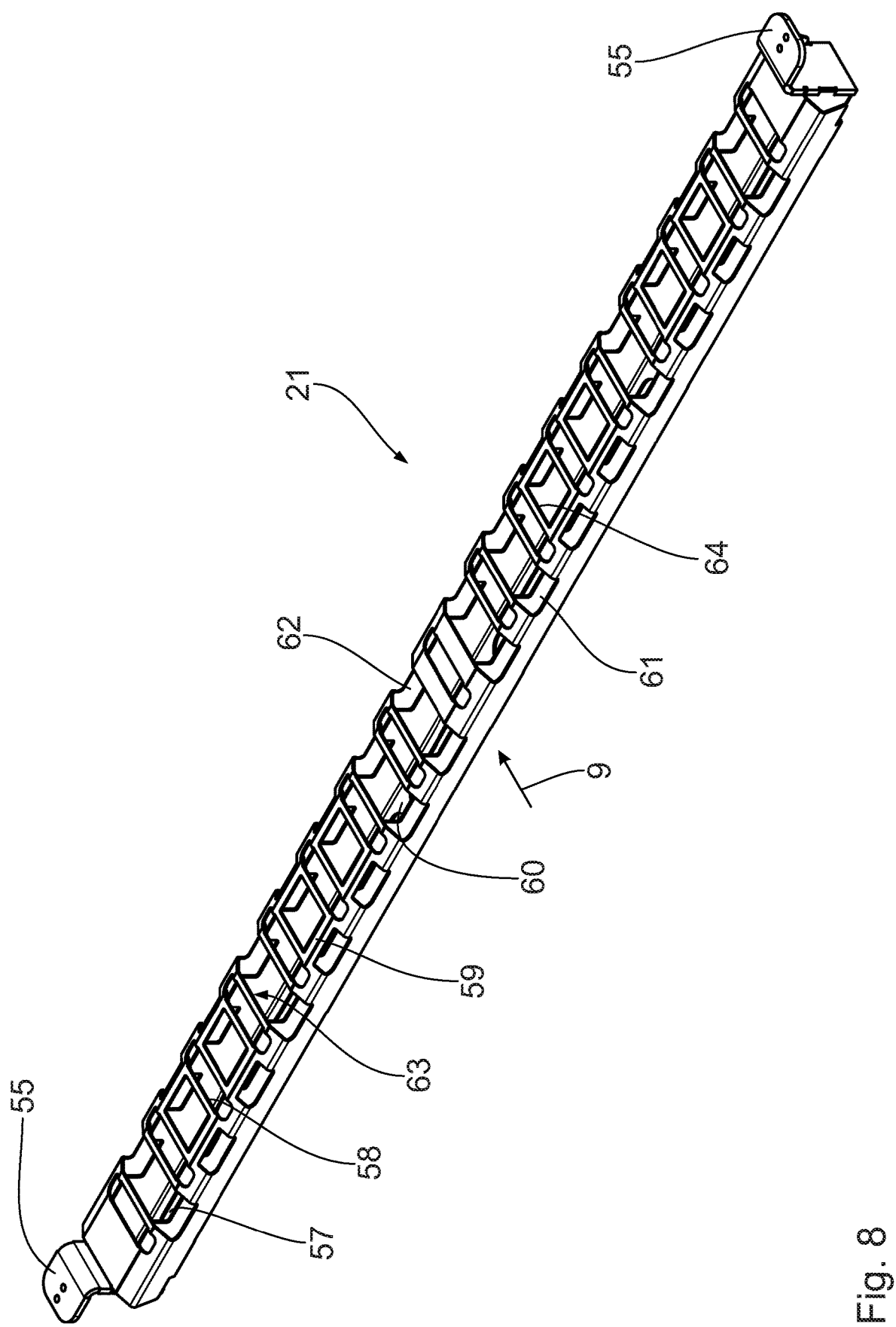
FIG. 8 shows a perspective view of a belt link of an endless conveyor belt of the baking oven.

One of the belt links 21 of the endless conveyor belt 20 will hereinafter be explained in more detail by means of FIGS. 8 and 9. As all belt links 21 of the endless conveyor belt 20 are designed identically, it is sufficient to describe one of the belt links 21.

The belt link 21 extends transversely to the conveying direction 9 between lateral guides 53, 54 for the endless conveyor belt 20, the guides 53, 54 being housed in the baking oven module 18 for the upper conveyor run 19. The respective belt link 21 is connected to these guides 53, 54 by suspension mounting plates 55.

The upper conveyor run 19 extends in a conveying plane 56, which is parallel to the arrangement planes of the pipe heat exchangers 11, 12 (cf. arrangement plane 35).

Figure 9:
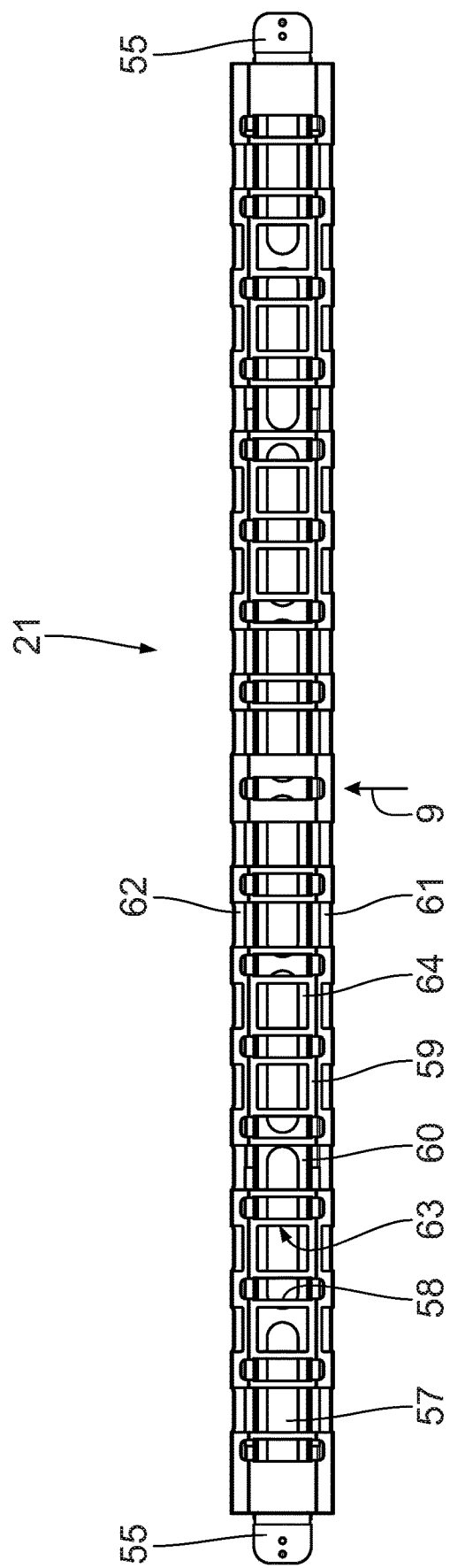
FIG. 9 shows a top view of the belt link shown in FIG. 8.

In a projection in a direction perpendicular to the conveying plane 56, in other words seen in the viewing direction of FIG. 9, the belt link 21 has gas passage openings 57, 58. These gas passage openings 57, 58 have total opening surface area, which amounts to at least 30% of a total surface area of the projection of the belt link 21.

Between the lateral guides, in other words between the two suspension mounting plates 55, the belt link 21 has a plurality of link planes 59, 60, which—in the embodiment 2 shown—are spaced from each other in a direction perpendicular to the conveying plane 56.

The first, upper link plane 59 coincides with the conveying plane 56 and is defined by a plurality of double link brackets 63 extending along the conveying direction 9 between lateral link side walls 61, 62. The gas passage openings 58 are formed between the brackets of the respective double link bracket 63. Further gas passage openings in the upper link plane 59 are formed between in each case two adjacent double link brackets 63.

For the belt links 21, which form the upper conveyor run 19 at a particular instant, the second, lower link plane 60 is formed below the first link plane 59. There, a reinforcement plate 64 runs between the link side walls 61, 62 in which the gas passage openings 57 are formed.

The gas passage openings 57 in the reinforcement plate 64 extend in the manner of elongate holes. The gas passage openings 57 have a longitudinal extension in the direction of the longitudinal extension of the belt link 21.

The gas passage openings 58 between the brackets of the respective double link bracket 63 are designed in the manner of elongate holes. The gas passage openings 58 have a longitudinal extension transverse to the longitudinal extension of the belt link 21, in other words parallel to the conveying direction 9, as long as the belt link 21 is part of the upper conveyor run 19.

Between the suspension mounting plates 55, the belt link 21 is designed in a self-supporting manner.

In the operation of the tunnel conveyor baking oven 1, the belt links 21 circulate endlessly between the guides 53, 54 in the manner of chain links, with the upper conveyor run 19 running in the conveying direction 9 and the lower conveyor run 22 running counter to the conveying direction 9. In the region of the leading baking oven module $2_1$ and the last baking oven module $2_N$, a 180° deflection takes place between the upper conveyor run 19 and the lower conveyor run 22 via the guides 53, 54, which are designed correspondingly.

What is claimed is:

1. An endless conveyor belt for a conveyor baking oven, having a conveyor run with a plurality of belt links, the belt links having link side walls extending transversely to a conveying direction that are connected by a plurality of double link brackets and being mounted between lateral guides that extend in the conveying direction,
wherein each of the belt links, seen in projection in a direction perpendicular to a conveying plane, has gas passage openings with a total opening surface area, which amounts to at least 30% of a total surface area of the projection of the belt link,
wherein between the lateral guides, each of the belt links has a lower link plane and an upper link plane in which respective gas passage openings are formed, the lower link plane and the upper link plane being spaced from each other in a direction perpendicular to the conveying plane,
wherein the gas passage openings of one of the lower link plane and the upper link plane have a longitudinal extension along the extension of the belt link,
wherein the gas passage openings of another one of the lower link plane and the upper link plane have a longitudinal extension transverse to the extension of the belt link,
wherein the gas passage openings in a reinforcement plate in the lower link plane are shaped as elongated holes,
wherein the gas passage openings between brackets of the respective double link brackets in the upper link plane are shaped as elongated holes.

2. The endless conveyor belt as claimed in claim 1, wherein the belt links are configured in a self-supporting manner between suspension mounting plates by which they are mounted to the lateral guides.

3. A baking oven module with an endless conveyor belt as claimed in claim 1, and with a baking space through which a conveyor run of the conveyor belt runs.

4. A baking oven with an endless conveyor belt as claimed in claim 1 and with a baking space through which a conveyor run of the conveyor belt runs.

5. A belt link for an endless conveyor belt, comprising:
link side walls extending transversely to a conveying direction;
a plurality of double link brackets connecting the link side walls; and
suspension mounting plates for mounting the belt link between lateral guides that extend in the conveying direction of a conveyor baking oven,
wherein the belt link, seen in projection in a direction perpendicular to a conveying plane, has gas passage openings with a total opening surface area, which amounts to at least 30% of a total surface area of the projection of the belt link,
wherein the belt link has a lower link plane and an upper link plane in which respective gas passage openings are formed, the lower link plane and the upper link plane being spaced from each other in a direction perpendicular to the conveying plane,
wherein the gas passage openings of one of the lower link plane and the upper link plane have a longitudinal extension along the extension of the belt link, wherein the gas passage openings of another one of the lower link plane and the upper link plane have a longitudinal extension transverse to the extension of the belt link, wherein the gas passage openings in a reinforcement plate in the lower link plane are shaped as elongated holes, and wherein the gas passage openings between brackets of the respective double link brackets in the upper link plane are shaped as elongated holes.

* * * * *